June 26, 1934.　　　　J. D. TYGART　　　　1,964,372
BARBECUE OVEN
Filed April 8, 1932
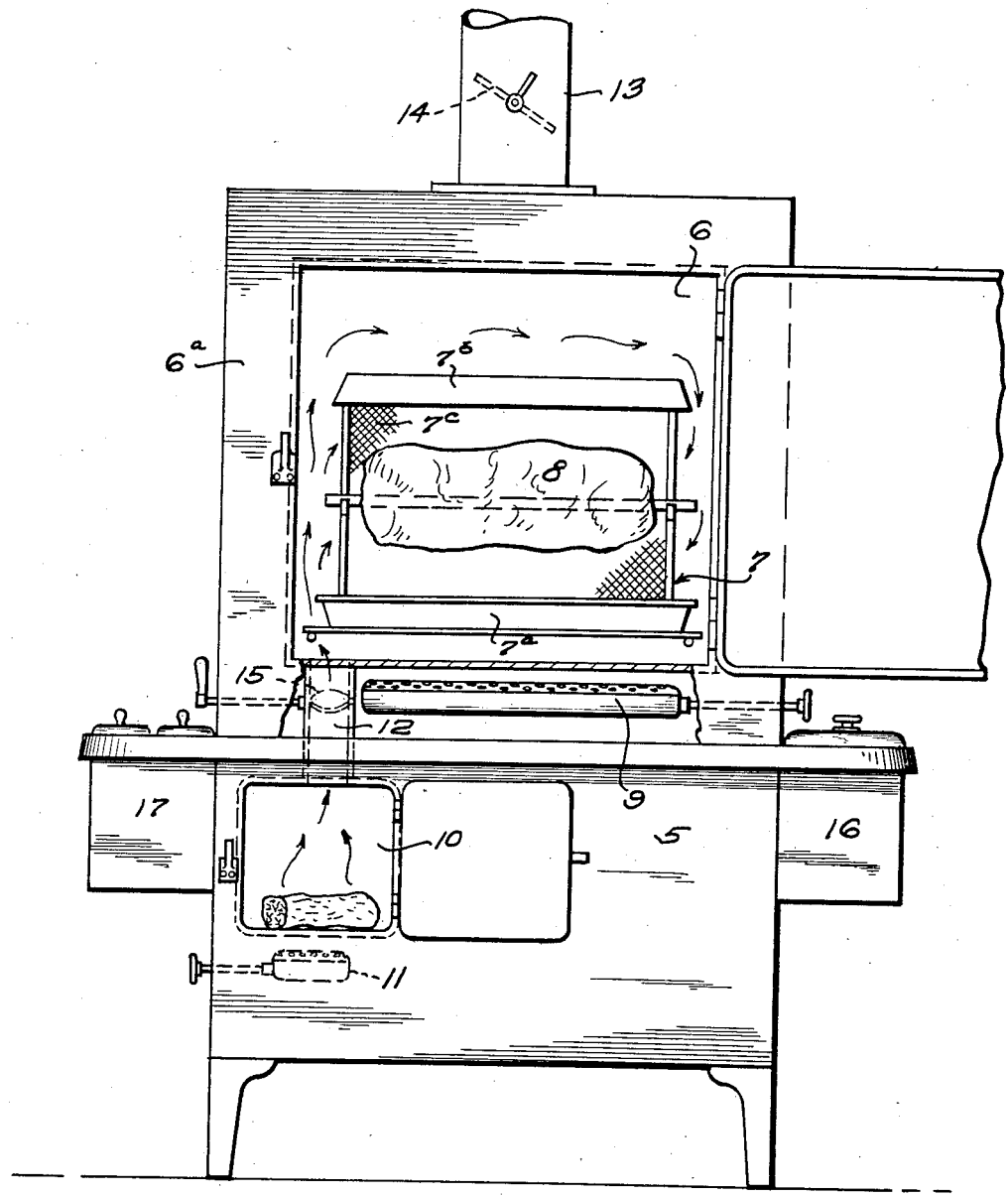
J. D. TYGART, Inventor
By Shepherd & Campbell
Attorneys Patented June 26, 1934

1,964,372

UNITED STATES PATENT OFFICE 1,964,372

BARBECUE OVEN

Jeff D. Tygart, Miami, Fla.

Application April 8, 1932, Serial No. 604,106

2 Claims. (Cl. 126—41)

This invention relates to a barbecue oven, and it has for its object to provide improved means for cooking meats in the barbecue fashion while eliminating many of the objections to the methods at present employed.

It is well recognized that probably the most appealing and appetizing characteristic of the barbecue meats secured at roadside barbecue stands is the wood smoke tang or flavor. However, the stands at present employed are open to the serious objections that they require almost constant attention, and frequently the meats are exposed to roadside dust and dirt. Roadside barbecue stands further find it objectionable to use pits and other methods of imparting the smoke flavor to the meats because of the open fire hazards, the cost of the wood, the loss of weight in the meats when cooking in the open in this fashion, and the very great amount of work involved in the constant attention required.

Therefore, it is the object of the present invention to provide a barbecue stove or range which will thoroughly cook large chunks of meat, completely through, under sanitary conditions, under conditions where the gravies may be served, and under conditions where the highly desirable wood smoke flavor may be imparted to the meats to any extent desired.

Further objects and advantages will be set forth in the detailed description which follows.

The figure shown in the accompanying drawing is a view partly in front elevation and partly in section of a stove constructed in accordance with the invention.

The stove comprises a body portion 5, oven 6 of a size adapted to receive a conventional type of self-basting baking pan, indicated at 7, and containing the meat, indicated at 8. Disposed in such juxtaposition to the oven 6, as to impart the necessary degree of heat thereto to thoroughly cook the meat through, is a heating unit 9 which may be electrical, gas, or otherwise. Disposed within the body 5 of the stove is a retort or oven 10 that is heated by a burner 11; this retort being adapted and intended to receive wood, and the heat from the unit 11 serving to distill the gaseous products from the wood and to discharge them through flue 12 into the oven 6 for the purpose of impregnating the meat with the wood smoke flavor.

A flue 13 leads from the jacket 6a and is provided with a damper 14. The flue 12 is likewise provided with a damper 15. The stove may carry a warming closet 16 for bread, and a warming closet 17 for sauces and gravies so that the making of appetizing sandwiches is facilitated. Burner 9 delivers heat into jacket 6a to heat oven 6 in a well known way.

Self-basting bakers of the character of that shown are well known and comprise a bottom pan 7a in which the liquids and gravies are caught, and a cover 7b which intercepts the rising steam and the condensation formation drips back upon the meat and keeps it moist or "basted". The sides of the baster may be open or closed to any desired extent by foraminous material, indicated at 7c.

I am aware of the fact that it has been heretofore proposed to provide smoke houses and the like with separate retorts for wood and to discharge the distilled products of said wood into the compartment where the meats are being smoked. However, devices of that character are not adapted to serve the purposes of my invention because they do not contemplate the cooking of the meat but merely the flavoring and preserving of the same. The meats smoked in devices of that sort must be additionally cooked at the time of use. My thought goes materially beyond this in that the source of heat, at 9, is the main source of heat and is of sufficient capacity to actually cook a considerable chunk of meat through. The auxiliary retort 10 serves merely to provide the flavoring effect of the wood smoke.

I wish it to be understood that the invention is not limited to the precise arrangement set forth because it is apparent that it is immaterial whether the wood be heated by a separate source of heat from that which heats the main oven 6, or whether it be heated by the same source of heat. The important point is some source of heat is provided for the wood and for the main oven, and that the source of heat for the main oven is in sufficient capacity to actually cook the meat. This I accomplish not only by providing the heat unit 9 of sufficient capacity, but by disposing such unit in such unobstructed relation to the main oven 6 as to accomplish the desired result.

Having described my invention, what I claim is:

1. A barbecue stove comprising an oven, a flame producing burner associated with and delivering its flame directly upon an exterior wall of said oven, said burner being of such large capacity as to deliver to the oven sufficient heat to cook and brown large chunks of fresh meats, means for conducting the products of combustion from said burner to a flue through a path which does not include any part of the oven interior, a separate closed exteriorly heated retort for the reception and distillation of untreated wood, and a flue leading from the retort to the oven to deliver such distilled products to the meat in said oven, such flue constituting the only means of communication between the interior of the retort and the interior of the oven.

2. A barbecue stove comprising an oven, a flame producing burner associated with and delivering its flame directly upon an exterior wall of said oven, said burner being of such large capacity as to deliver to the oven sufficient heat to cook and brown large chunks of fresh meats, means for conducting the products of combustion from said burner to a flue through a path which does not include any part of the oven interior, a closed retort for untreated wood, a separate flame producing agency delivering its flame upon the exterior of said retort to distill gaseous products from wood in said retort, a flue leading from the retort to the oven to deliver such distilled products to the meat in said oven, said flue constituting the only communication between the interior of the retort and the interior of the oven, the products of combustion from said flame producing agency passing off through a path which does not include the oven interior, whereby none of the products of combustion from said flame producing agency are permitted to enter said oven.

JEFF D. TYGART.